United States Patent Office 3,635,960
Patented Jan. 18, 1972

3,635,960
PARA-PHENYLTHIDIAZOLYL- AND PARA-PHEN-
YLOXDIAZOLYL DERIVATIVES OF STYRYL-
BENZOXAZOLES OR OF STYRYLBENZOTHIA-
ZOLES
Gaudenz Girell di Giovanoel, Arlesheim, Basel-Land, and
Reinhard Zweidler, Basel, Switzerland, assignors to
Ciba-Geigy Corporation, Ardsley, N.Y.
No Drawing. Filed Nov. 19, 1969, Ser. No. 878,215
Claims priority, application Switzerland, Nov. 22, 1968,
17,397/68
Int. Cl. C07d 91/62
U.S. Cl. 260—240 D        7 Claims

ABSTRACT OF THE DISCLOSURE p-Phenylthidiazolyl- and p - phenyloxdiazolyl-deriva-
tives of styrylbenzoxazoles or of styrylbenzothiazoles are
brighteners of organic material. The compounds are ob-
tained from the corresponding benzoylhydrazide-carbonyl
compounds through splitting off of water.

DESCRIPTION OF THE INVENTION

The present invention relates to new optical bright-
eners, the use of the brighteners for the brightening of
organic material as well as the organic material brightened
with the aid of the new optical brighteners.

New compounds have now been produced with which
a good brightening effect is obtained and which are versa-
tile in application. They correspond to the Formula I:

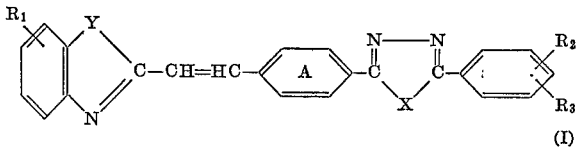

(I)

wherein

X and Y represent independently oxygen or sulphur, and
$R_1$ and $R_2$ represent independently hydrogen, an alkyl
group having 1 to 4 carbon atoms, the phenyl group
or a phenyl group substituted by chlorine, alkyl groups
having 1 to 4 carbon atoms or alkoxy groups having
1 to 4 carbon atoms, or alkoxy groups having 1 or 2
carbon atoms or chlorine, and
$R_3$ represents hydrogen or chlorine.

In particular, good effects are obtained with such
compound corresponding to the Formula I, wherein $R_1$
represents hydrogen, an alkyl group having 1 to 4 car-
bon atoms, or the methoxy group $R_2$ represents hydro-
gen, an alkyl group having 1 to 4 carbon atoms, the
methoxy group or chlorine and $R_3$ represents hydrogen
or chlorine.

The process for the production of the brighteners is
performed by condensation of a hydrazide of the For-
mula II:

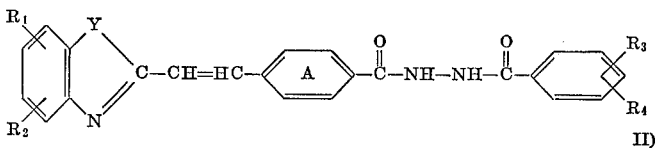

(II)

with the splitting off of water, optionally in the presence
of phosphorus pentasulphide.

The condensation is advantageously performed with
the addition of agents splitting off water, such as $POCl_3$
or p-toluenesulphonic acid. If X in the Formula I repre-
sents sulphur, the condensation is carried out in the pres-
ence of phosphorus pentasulphide which acts both as a
dehydrating agent and as an agent introducing sulphur.
The starting material of the Formula II is obtained in
a known manner by reacting, for example, molar amounts
of 2-methylbenzoxazole in an organic solvent, such as
xylene or chlorobenzene or toluene, in the presence of di-
methylformamide and p-toluene-sulphonic acid, with
terephthaldehydic acid to give the styryl compound and
subsequently converting the carboxylic aid group with
$POCl_3$ into the carbonyl-chloride group and condensing
the carbonyl chloride compound with a phenylhydrazide.

The new optical brighteners are yellowish, crystalline
powders which are practically insoluble in water but
which produce in organic solvents, and also in dimethyl-
formamide, clear solutions. In general, they are very
stable to heat, light and other physical effects.

These compounds can be added to organic polymers,
and to spinning solutions, e.g. from polyamides such as
nylon, polyesters such as Dacron, to polyolefins, such
as polypropylene, cotton, cellulose-2 ½-acetate or cel-
lulose-triacetate. Preferred are polyamides, polyesters
and polyolefins. The products produced therefrom, such
as films, sheets and fibres, exhibit a brilliant white effect
which is fast to light. The compounds, according to the
invention, can also be used for the optical brightening
of textile material. This is treated in the form of loose
fibers, yarns, fabrics or knitted goods, with an aqueous
dispersion of the brighteners, optionally in the presence
of other active substances such as detergents, or auxiliary
agents such as dispersing agents, preferably at tempera-
tures of 50–100° C. The amounts of optical brighteners,
thereby applied to the textile material, can vary within
wide limits, e.g. from 0.001% to 0.5%, especially from
0.01 to 0.2%. The brighteners can also be worked into
washing agents such as soap, and can be applied to the
textiles in washing baths.

The temperatures are given in degrees centigrade in
the following examples.

EXAMPLE 1

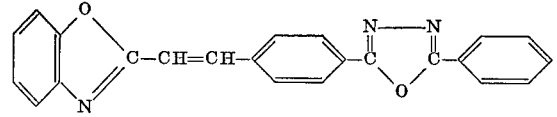

21.6 g. of 2 - [(4 - carboxybenzoylhydrazide)-styryl]-
benzoxazole are refluxed in 300 ml. of phosphorus oxy-
chloride for 14 hours. The whole is then poured on to ice
and the crude product is filtered with section. The thus
obtained 2 - [4 - (2 - phenyl-1,3,4-oxdiazolyl)-styryl]-
benzoxazole is purified by recrystallisation from chlorobenzene, M.P. 250–251°. In organic solvents, the substance exhibits a strong reddish violet fluorescence in daylight. As optical brightener, the compound is suitable for polyamide such as nylon, polyester such as Dacron, 2 ½ acetate and cotton.

The starting material, the 2 - [(4 - carboxybenzylhydrazide)-styryl]-benzoxazole, which is required for the production of the compound of Example 1, is obtained as follows:

2-methylbenzoxazole and terephthaldehydic acid are condensed in molecular amounts in the presence of p-toluenesulphonic acid and dimethylformamide in xylene to 2-(4-carboxystyryl)-benzoxazole. The thus obtained carboxylic acid is converted to toluene with phosphorus oxychloride, in the presence of pyridine, into the acid chloride. A suspension of 28.3 g. of the obtained 2-(4-carbonyl chloride-styryl)-benzoxazole in 500 ml. of pyridine is added within 20 minutes, whilst maintaining a temperature of 0–5°, to a clear solution—cooled to 0–5°—of 13.6 g. of benzoylhydrazine in 200 ml. of pyridine. The yellow suspension is stirred for 1 hour, heated within 1 hour to 90° and further stirred for 3 hours at 90°. The suspension is then cooled to room temperature and the clear reddish solution poured on to 500 ml. of ice water. The precipitated product is filtered with suction and dried.

If, instead of the stated benzoxazole compound, the corresponding thiazole compound is used as starting material, then the compound of the following formula is obtained

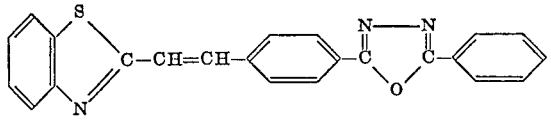

which has a melting point of 253–254°.

EXAMPLE 2

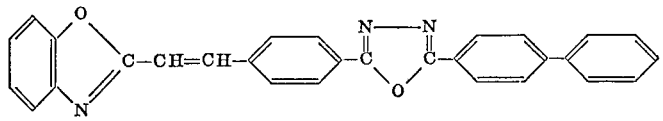

28.8 g. of 2 - [(4 - carboxylic acid-diphenylhydrazide)-styryl]-benzoxazole are refluxed in 400 ml. of phosphorus oxychloride for 14 hours. The mixture is then poured on to ice water and the crude product filtered with suction. The thus obtained 2-[4-(2-diphenyl - 1,3,4 - oxdiazolyl)-styryl]-benzoxazole is purified by recrystallisation from chlorobenzene, M.P. 269–270°. In organic solvents, the compound exhibits a beautiful reddish-violet fluorescence. It is particularly suitable for the optical brightening of nylon and polyester.

The starting material can be produced as follows:

21.2 g. of diphenyl-4-carboxylic acid hydrazide are dissolved in 200 ml. of pyridine and cooled to 0–5°. To this clear solution is added, within 20 minutes and whilst maintaining a temperature of 0–5°, a suspension of 28.3 g. of 2-[4-carboxy chloride-styryl]-benzoxazole in 500 ml. of pyridine. The yellow suspension is stirred for 1 hour, heated within 1 hour to 90° and further stirred for 3 hours at 90°. The suspension is then cooled to room temperature and the clear solution poured on to 500 ml. of ice water. The precipitated product is filtered with suction and dried.

EXAMPLE 3

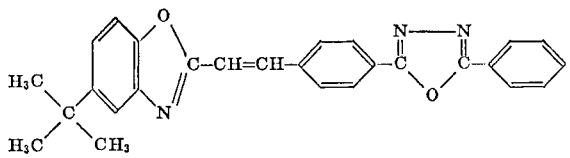

27.4 g. of 2 - [(4 - carboxylbenzoylhydrazide)styryl]-5-t.butylbenzoxazole are refluxed in 300 ml. of phosphorus oxychloride for 14 hours. The mixture is then poured on to ice and the crude product filtered with suction. The thus obtained 2-[4-(2-phenyl-1,3,4-oxdiazolyl)styryl]-5-t. butylbenzoxazole is purified by recrystallisation from ligroin, M.P. 208–210°. In organic solvents, the substance exhibits a strong reddish violet fluorescence. The compound is suitable for the optical brightening of organic substances, especially nylon and polyester.

The starting material, the 2 - [(4 - carboxybenzoylhydrazide)-styryl]-5-t.butylbenzoxazole, is produced as follows:

2 - methyl-5-t.butylbenzoxazole and terephthaldehydic acid are condensed in molar amounts in the presence of p-toluenesulphonic acid and dimethylformamide in xylene to the styryl derivative. The thus obtained carboxylic acid is converted in toluene with phosphorus oxychloride, in the presence of pyridine, into the acid chloride. 34 g. of this 2-[4-carboxychloride-styryl] - 5 - t.butylbenzoxazole, suspended in 500 ml. of pyridine, are added within 20 minutes, whilst maintaining a temperature of 0–5°, to a clear solution (cooled to 0–5°) of 13.6 g. of benzoylhydrazine in 200 ml. of pyridine.

The yellow suspension is stirred for 1 hour, heated within 1 hour to 90° and stirred for a further 3 hours at 90°. The suspension is then cooled to room temperature and the clear reddish solution poured on to 500 ml. of ice water. The precipitated product is filtered with suction and dried.

Compounds of the formula

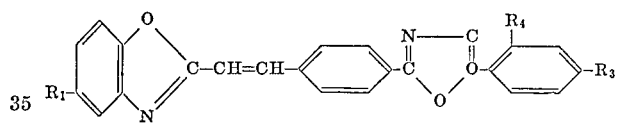

wherein the radicals $R_1$, $R_3$ and $R_4$ have the meanings given in the following Table I, are produced in a similar manner to that described in Examples 1–3.

TABLE I

| Example Number | $R_1$ | $R_3$ | $R_4$ | Melting point deg. |
|---|---|---|---|---|
| 4 | H | Cl | H | 279–280 |
| 5 | H | Cl | Cl | 227–228 |
| 6 | H | t.Butyl | H | 219–220 |
| 7 | H | OCH₃ | H | 244–246 |
| 8 | H | CH₃ | H | 253–254 |
| 9 | CH₃ | H | H | 249–251 |
| 10 | CH₃ | Cl | H | 242–244 |
| 11 | CH₃ | Cl | Cl | 268–270 |
| 12 | CH₃ | t.Butyl | H | 270–271 |
| 13 | CH₃ | OCH₃ | H | 276–278 |
| 14 | CH₃ | Phenyl | H | 261–262 |
| 15 | CH₃ | CH₃ | H | 275–276 |
| 16 | t.Butyl | Cl | Cl | 253–255 |
| 17 | do | t.Butyl | H | 229–222 |
| 18 | do | Phenyl | H | 250–255 |
| 19 | do | H | H | 216–218 |
| 20 | OCH₃ | H | H | 205–209 |

EXAMPLE 21

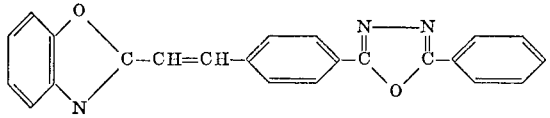

21.6 g. of 2-[(4-carboxybenzoylhydrazide-styryl]benzoxazole are placed into 150 ml. of pyridine. Within 15 minutes, 30 g. of phosphorus pentasulphide are introduced in portions and, as a result of exothermic action, the temperature rises to 65°. The whole is heated within 30 minutes to reflux temperature and maintained for 15 hours at this temperature. It is then cooled to room temperature, 100 ml. of ethanol are added and the whole is subsequently poured on to 1500 ml. of ice water. After neutralisation of the mixture with sodium hydroxide, the suspension is filtered off, the residue dried and recrystallised from chlorobenzene. M.P. 179–180°.

The compound is suitable for the brightening of polyamide, polyester, acetate and cotton.

The starting material can be produced as follows:

13.6 g. of benzoylhydrazine are dissolved in 200 ml. of pyridine and cooled to 0–5°. To this clear solution is added, within 20 minutes, a suspension of 28.3 g. of 2-(4-carboxychloride-styryl)-benzoxazole in 500 ml. of pyridine, whilst maintaining a temperature of 0–5°. The yellow suspension is stirred for 1 hour, heated then within 1 hour to 90° and stirred for a further 3 hours at 90°. It is subsequently cooled to room temperature and the clear solution poured on to 500 ml. of ice water. The precipitated product is filtered with suction and dried.

A similar procedure is used for the production of compounds of the formula

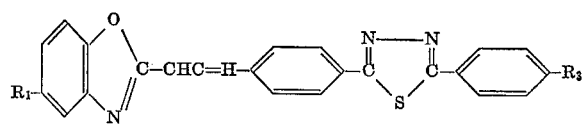

wherein $R_1$ and $R_3$ have the following meaning:

| Example Number | $R_1$ | $R_3$ | Melting point |
| --- | --- | --- | --- |
| 22 | H | Cl | 285–289° |
| 23 | t.Butyl | H | 215–218° |

EXAMPLE 24

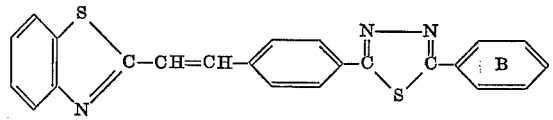

21.6 g. of 2-[(4-carboxybenzoylhydrazide)-styryl]benzothiazole are placed into 150 ml. of pyridine. 30 g. of phosphorus pentasulphide are added, in portions, within 15 minutes. As a result of exothermic reaction, the temperature rises to 65°. The whole is heated within 30 minutes to reflux temperature and maintained for 15 hours at this temperature. It is thereupon cooled to room temperature, 150 ml. of ethanol are added and the whole is subsequently poured on to 1500 ml. of ice water. After neutralisation of the mixture with concentrated sodium hydroxide solution, the suspension is filtered. The residue is dried and recrystallised from chlorobenzene. M.P. 276–278°. The compound is suitable for the brightening of polyamide, polyester, acetate and cotton.

The starting material can be produced as follows:

13.6 g. of benzoylhydrazine are dissolved in 200 ml. of pyridine and cooled to 0–5°. To this clear solution is added within 20 minutes, whilst maintaining a temperature of 0.5°, a suspension of 29.9 g. of 2-(4-carboxychloride-styryl)-benzothiazole in 500 ml. of pyridine. Stirring is continued for a further 3 hours at 90°. The temperature is then lowered to room temperature and the clear solution is poured on to 500 ml. of ice water. The precipitated product is filtered with suction and dried.

In a similar manner is produced a compound, differing from that mentioned in Example 24 only by a methoxy substituent in the p-position in the benzene ring denoted by B. The compound has a melting point of 252–254°.

EXAMPLE 25

Brightening of polyester from a long bath and carrier 0.2 g. of trichlorobenzene are added as carrier ("Dilatin TC") to 100 ml. of water. A solution is produced from the optical brightener of Example 1 by dissolving 1 g. thereof in 1000 ml. of glycol monoethyl ether. 1.5 ml. of this stock solution are added to the above described solution. This aqueous solution containing the brightener is heated to 60°. 3 g. of polyester fabric are then introduced into the solution. The temperature is raised within 10–15 minutes to 95–98° and the fabric is left in the solution for 1 hour at this temperature. The fabric is then rinsed and dried.

The thus treated fabric has a clearly whiter and more brilliant appearance than the untreated starting material.

EXAMPLE 26

Brightening of polyester in the washing bath

To 100 ml. of water are added 0.4 g. of detergent of following composition:

Dodecylbenzenesulphonate 16%, fatty alcohol sulphonate 4%, Na-tripolyphosphate 25%, tetrasodium pyrophosphate 7%, Mg-silicate ($MgSiO_3$) 2%, Na-disilicate ($Na_2(SiO_3)_2$) 7%, carboxymethyl cellulose 1%, "Sequestren ST" 0.5%, sodium sulphate ca. 25%, water 2.5%.

(Instead of sodium sulphate, the detergent can also contain 10–20% of Na-perborate or another agent releasing oxygen.)

A solution is produced from the optical brightener of the Example 3 by dissolving 1 g. of the optical brightener in 1000 ml. of glycol monoethyl ether. 0.8 ml. of this stock solution are added to the above described solution. This aqueous solution containing the brightener is heated to 55–60° and 3 g. of polyester fabric are introduced into the solution. The fabric is left in the solution for 20 minutes at this temperature. The fabric is then rinsed and dried.

The thus treated section of fabric has a whiter appearance after the treatment than before.

EXAMPLE 27

Brightening of polyamide using the exhaust process, with acid

To 100 ml. of water are added 0.12 ml. of 85% formic acid and 0.06 g. of alkylpolyglycol ether ("Tinegal NA"). A solution is produced from the optical brightener of Example 1 by dissolving 1 g. of the optical brightener in 1000 ml. of glycolmonoethyl ether. 3 ml. of this stock solution are added to the above described aqueous solution. This aqueous solution containing the brightener is heated to 60° and 3 g. of nylon staple fabric are introduced into the solution. The temperature is increased within 10–15 minutes to 90–92° and the fabric is left in the solution for 30 minutes at this temperature, whereupon it is rinsed and dried.

Compared with the untreated starting material, the thus treated fabric has a clearly whiter and more brilliant appearance.

EXAMPLE 28

Brightening of polyamide using the exhaust process, neutral

To 100 ml. of water are added 0.06 g. of alkylpolyglycol ether ("Tinegal NA"). A solution is produced from the optical brightener of the Example 1 by dissolving 1 g. of the optical brightener in 1000 ml. of glycol monoethyl ether. 3 ml. of this stock solution are added to the above described aqueous solution. This aqueous solution containing the brightener is heated to 60° and 3 g. of nylon staple fabric are introduced into the solution. The temperature is increased within 10–15 minutes to 90–92° and the fabric is left in the solution for 30 minutes at this temperature. The fabric is then rinsed and dried.

Compared with the untreated starting material, the thus treated fabric has a clearly whiter and more brilliant appearance.

EXAMPLE 29

Brightening of polyamide in the washing bath

To 100 ml. of water are added 0.4 g. of detergent as given in the Example 26. A solution is produced from the optical brightener of the Example 1 by dissolving 1 g. thereof in 1000 ml. of glycol monomethyl ether. 2 ml. of this stock solution are added to the above described aqueous solution. This aqueous solution containing the brightener is heated to 55–60° and 3 g. of polyamide fabric are introduced into the solution. The fabric is left for 30 minutes in the solution at this temperature. The fabric is afterwards rinsed and dried.

EXAMPLE 30

Brightening of cotton in the washing bath 0.4 g. of detergent, as given in the Example 26, are added to 100 ml. of water. A solution is prepared from the optical brightener of the Example 1 by dissolving 1 g. thereof in 1000 ml. of glycol monoethyl ether. 2 ml. of this stock solution are added to the above described aqueous solution. This aqueous solution containing the brightener is heated to 92° and 3 g. of cotton fabric are introduced into the solution. The fabric is left in the solution for 30 minutes at this temperature, whereupon the fabric is rinsed and dried.

Compared with the untreated starting material, the thus treated fabric has a clearly whiter appearance.

EXAMPLE 31

Brightening of triacetate using the exhaust process 0.6 ml. of 4% acetic acid and 0.06 g. of alkylpolyglycol ether ("Tinegal NA") are added to 100 ml. of water. A solution is prepared from the optical brightener of the Example 1 by dissolving 1 g. thereof in 1000 ml. of glycol monoethyl ether. 6 ml. of this stock solution are added to the above described aqueous solution. This aqueous solution containing the brightener is heated to 60° and 3 g. of triacetate-twill fabric are introduced into the solution. The temperature is raised within 10–15 minutes to 95–98° and the fabric is left in the solution for 30 minutes at this temperature. The fabric is thereupon rinsed and dried.

Compared with the untreated starting material, the thus treated fabric has a clearly whiter and more brilliant appearance.

EXAMPLE 32

Brightening of 2 ½-acetate using the exhaust process 0.6 ml. of 4% acetic acid and 0.06 g. of alkylpolyglycol ether ("Tinegal NA") are added to 100 ml. of water. A solution is prepared from the optical brightener of the Example 1 by dissolving 1 g. thereof in 1000 ml. of glycol monoethyl ether. 6 ml. of the stock solution are added to the above described aqueous solution. The aqueous solution containing the brightener is heated to 40° and 3 g. of acetate-satin fabric are introduced into the solution. The temperature is raised within 10–15 minutes to 75° and the fabric is left in the solution for 30 minutes at this temperature. The fabric is thereupon rinsed and dried.

Compared with the untreated starting material, the thus treated fabric has a clearly whiter and more brilliant appearance.

EXAMPLE 33

Brightening of polypropylene, e.g. "Meraklon"-fabric, using the exhaust process 0.6 ml. of 4% acetic acid and 0.06 g. of alkylpolyglycol ether ("Tinegal NA") are added to 100 ml. of water. A solution is prepared from the optical brightener of the Example 3 by dissolving 1 g. of the optical brightener in 1000 ml. of glycol monoethyl ether. 3 ml. of this stock solution are added to the above described aqueous solution. This aqueous solution containing the brightener is heated to 40° and 3 g. of "Meraklon"-fabric are introduced into the solution. The temperature is raised within 10–15 minutes to 95–98° and the fabric is left in the solution for 30 minutes at this temperature. The fabric is thereupon rinsed and dried.

Compared with the untreated starting material, the thus treated fabric has a clearly whiter, more brilliant appearance.

EXAMPLE 34

Brightening of polyester using the HT-process 0.3 g. of alkylpolyglycol ether ("Tinegal NA") and 0.15 g. of trichlorobenzene as carrier ("Dilatin TC") are added to 285 ml. of water. A solution is prepared from the optical brightener of the Example 1 by dissolving 1 g. thereof in 1000 ml. of glycol monoethyl ether. 15 ml. of this stock solution are added to the above described solution. This aqueous solution containing the brightener is heated to 20–30° and 15 g. of polyester fabric are introduced into the solution. The temperature is raised within 30 minutes to 130° and the fabric is left in the solution for 30 minutes at this temperature. The temperature is lowered to 60° within 15–20 minutes and the fabric is then rinsed and dried.

Compared with the untreated starting material, the thus treated fabric has a clearly whiter and more brilliant appearance.

EXAMPLE 35

Brightening of polyesters during polycondensation

In a stainless-steel autoclave provided with a stirrer, a gas-inlet tube, a vacuum arrangement, a descending condenser, a shut-off nozzle in the base, a charging-valve and heating-jacket, 388 g. of benzene-1,4-dicarboxylic acid-dimethyl ester, 300 g. of 1,2-ethanediole and 0.4 g. of antimonous oxide are heated, whilst blowing through pure nitrogen, to 200° external temperature and held for 3 hours at this temperature, whereby methanol slowly distills off.

With the exclusion of air, 0.4 g. of 2-[4-(2-phenyloxdiazolyl)-styryl]-5-methylbenzoxazole, dissolved in 40 g. of 1,2-ethanediole, are carefully charged into the autoclave, after the temperature has been allowed to fall to 190°. After the addition is completed, the temperature is raised within one hour to 285° external temperature, whereby 1,2-ethanediole distills off. Vacuum is then applied to the autoclave, the pressure slowly reduced to 0.2 torr and the condensation completed under these conditions during 3 hours. Vigorous stirring is maintained during this operation. The liquid condensation polymer is then extruded under nitrogen pressure through the bottom nozzle. From the thus obtained polymers, monofilaments can be produced having a brilliant white appearance.

EXAMPLE 36

Brightening of polyester fibres in the spinning solution 1000 parts of polyester granulate from polyterephthalic acid glycol ester are intimately mixed with 0.3 part of 2-[4-(2-phenyloxdiazolyl)-styryl] - 5 - t.butylbenzoxazole and, while stirring, melted at 285°. After extrusion of the melt under a nitrogen pressure of 2–3 atmospheres through normal spinning nozzles, greatly brightened polyester fibres are obtained. The thus achieved white effects exhibit a good fastness to washing and to light.

A similar effect is obtained if, in the above example, the stated brightener, i.e. 0.3 part of 2-[4-(2-phenyloxdiazolyl)-stearyl]-benzoxazole, is replaced by 0.3 part of 2-[4-(2-diphenyloxdiazolyl)-styryl]-benzoxazole.

EXAMPLE 37

Brightening of polyamide fibres in the spinning solution

500 parts of polyamide shreds from δ-caprolactam, 1.5 parts of titanium dioxide (Anatas) and 0.25 part of 2-[4-(2 - phenyloxdiazolyl)-stearyl]-5-methylbenzoxazole are mixed in a rotary mixer for 10 hours. The mixture is then melted in a stainless-steel autoclave at 250–260° with the exclusion of oxygen, extruded under nitrogen pressure through a nozzle and stretched to the extent of 400%. A brightened white fibre is obtained having a good fastness to light.

EXAMPLE 38

Brightening of polyamide during polymerisation

400 parts of caprolactam, 40 parts of water, 0.4 part of the compound of the Example 1 and 1.6 parts of titanium dioxide (Anatas) are mixed together and heated to ca. 70° until the mass has liquified. The liquid mixture is transferred to a stainless-steel pressure vessel and heated within one hour, with the exclusion of oxygen, to a temperature of ca. 250°, whereby a pressure of 10–15 atmospheres is established. After this period of time, the water is distilled off and the polymeric mixture subsequently maintained at 250° for 3 hours under vacuum in order to effect complete degassing. The mixture thereby assumes a viscosity which enables the polymerisate to be extruded in the form of filaments, by means of nitrogen pressure, through a nozzle situated in the base of the pressure vessel. The solidified polyamide is separated, by extraction with water, from monomeric constituents. The polyamide fibre, obtained by this process, is characterised by a very high degree of whiteness. The brightening agent is fixed so that it has fastness to washing and the polyamide fibres, which have an improved appearance, have a good fastness to light.

EXAMPLE 39

Brightening of polypropylene fibers in the spinning solution

100 parts of polypropylene are homogenised with 0.5 part of titanium dioxide and 0.06 part of the brightener of the Example 1 in a kneading machine at 200°. The melt is extruded, by known methods, under an inert gas pressure of 2–3 atmospheres, through spinning nozzles and at a temperature of 280–300°.

The thus obtained polypropylene threads are characterised by a high degree of whiteness.

What we claim is:

1. Compounds of the Formula I

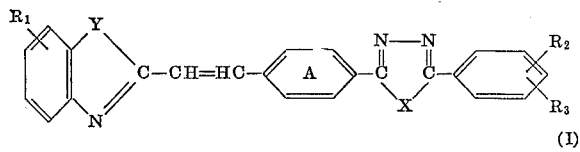

wherein

X and Y represent independently oxygen or sulphur, and $R_1$ and $R_2$ represent independently hydrogen, an alkyl group having 1 to 4 carbon atoms, the phenyl group or a phenyl group substituted by chlorine, alkyl groups having 1 to 4 carbon atoms or alkoxy groups having 1 to 4 carbon atoms, or alkoxy groups having 1 or 2 carbon atoms or chlorine, and $R_3$ represents hydrogen or chlorine.

2. Compounds according to claim 1, wherein $R_1$ represents hydrogen, an alkyl group having 1 to 4 carbon atoms, or the methoxy group, $R_2$ represents hydrogen, an alkyl group having 1 to 4 carbon atoms, the methoxy group or chlorine and $R_3$ represents hydrogen or chlorine.

3. A compound as claimed in claim 1 which has the formula

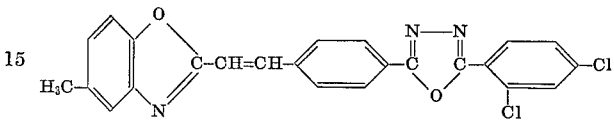

4. A compound as claimed in claim 1 which has the formula

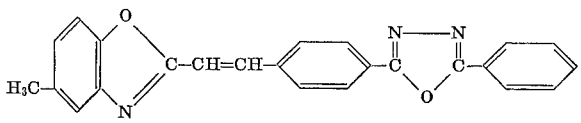

5. A compound as claimed in claim 1 which has the formula

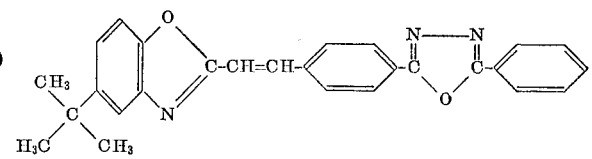

6. A compound as claimed in claim 1 which has the formula

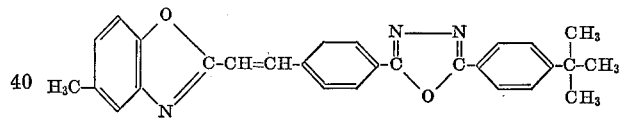

7. A compound as claimed in claim 1 which has the formula

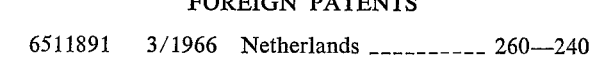

References Cited

FOREIGN PATENTS

6511891   3/1966   Netherlands _____ 260—240

HENRY R. JILES, Primary Examiner

G. T. TODD, Assistant Examiner

U.S. Cl. X.R.

117—33.5 T; 252—301.2 W

Notice of Adverse Decision in Interference

In Interference No. 98,286 involving Patent No. 3,635,960, G. Girell di Giovanoel and R. Zweidler, PARA-PHENYLTHIDIAZOLYL- AND PARA-PHENYLOXIDIAZOLYL DERIVATIVES OF STYRYLBENZOXAZOLES OR OF STYRYLBENZOTHIAZOLES, final judgment adverse to the patentees was rendered Oct. 5, 1973, as to claims 1, 2, 4, 6 and 7.

[*Official Gazette February 26, 1974.*]